United States Patent [19]

Goertz et al.

[11] Patent Number: 4,500,042
[45] Date of Patent: Feb. 19, 1985

[54] TWO-WAY KNIFE ADJUSTMENT FOR CROP HARVESTER CUTTING CYLINDER

[75] Inventors: Arnold E. Goertz, Buhler; Ronald K. Guinn, Valley Center, both of Kans.

[73] Assignee: Hesston Corporation, Hesston, Kans.

[21] Appl. No.: 410,376

[22] Filed: Aug. 23, 1982

[51] Int. Cl.³ .............................................. B02C 18/18
[52] U.S. Cl. ...................................... 241/238; 83/677; 241/282.2; 241/294
[58] Field of Search ............ 241/293, 294, 238, 282.2; 16/238, 245, 246; 83/700, 699, 677; 403/4, 408

[56] References Cited

U.S. PATENT DOCUMENTS 1,929,586 10/1933 Holland-Letz .................. 241/238 X
2,660,242 11/1953 Lane ................................. 83/677 X Primary Examiner—Howard N. Goldberg
Assistant Examiner—Joseph M. Gorski
Attorney, Agent, or Firm—Schmidt, Johnson, Hovey & Williams

[57] ABSTRACT

The knife is normally clamped tightly against a supporting arm by a retaining bolt, but when the bolt is sufficiently loosened, the bolt itself and the knife through which it passes may be forced radially inwardly or outwardly by shifting a transversely reciprocable slide plate in the appropriate direction along its path of travel. An oblique slot in the slide plate receives the bolt and pushes it in the selected adjusting direction as the slot is displaced transversely by shifting of the plate. A pair of counter-acting set screws serve as means for shifting the plate and for releasably retaining the same in a selected position. A long key on the slide plate slidably fits into a mating key way on the supporting arm to guide the plate in its transverse movement, and because the key extends transversely of the path of in-and-out adjusting travel of the knife, it helps absorb and resist radial loading on the knife which occurs during the cutting operation.

8 Claims, 8 Drawing Figures

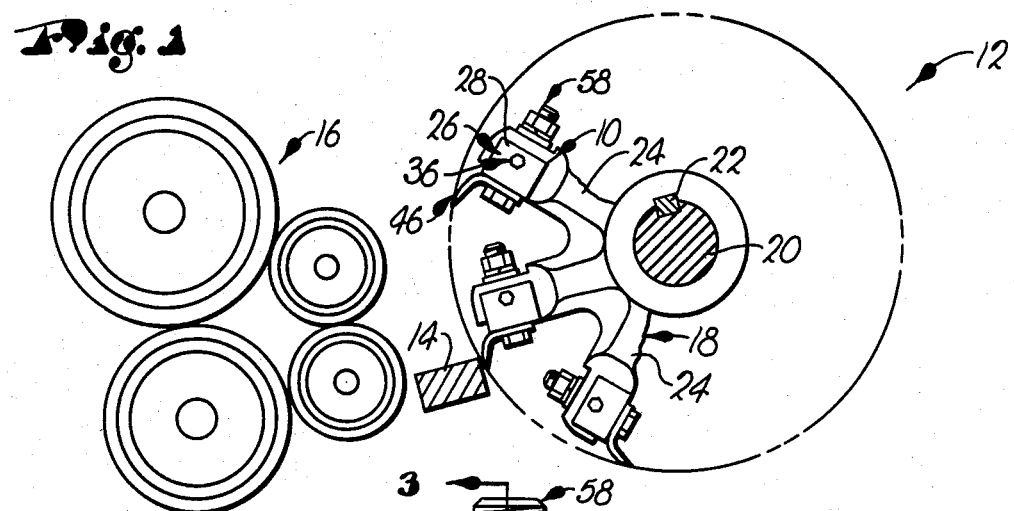
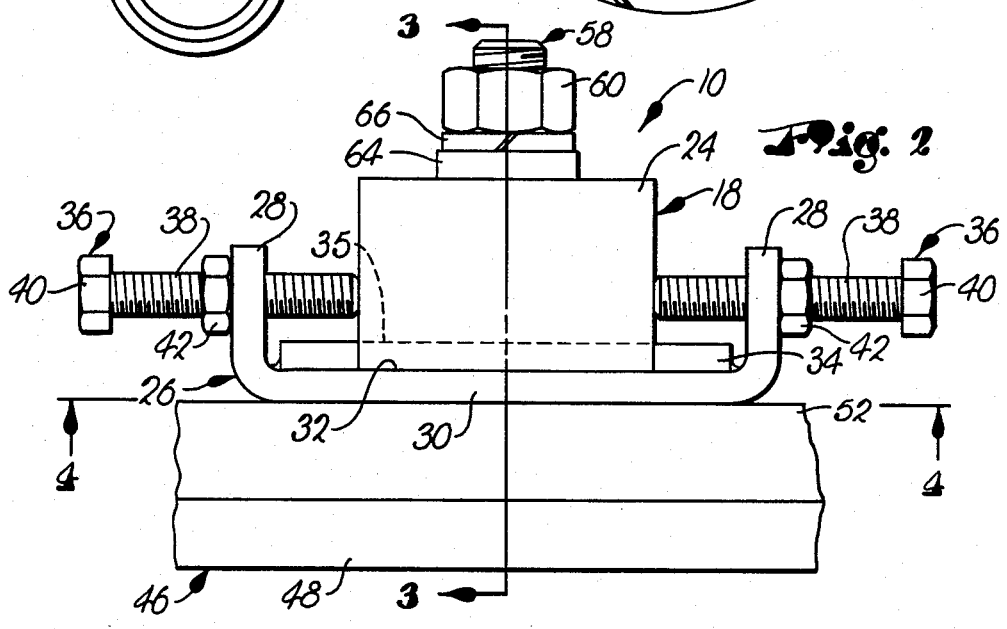
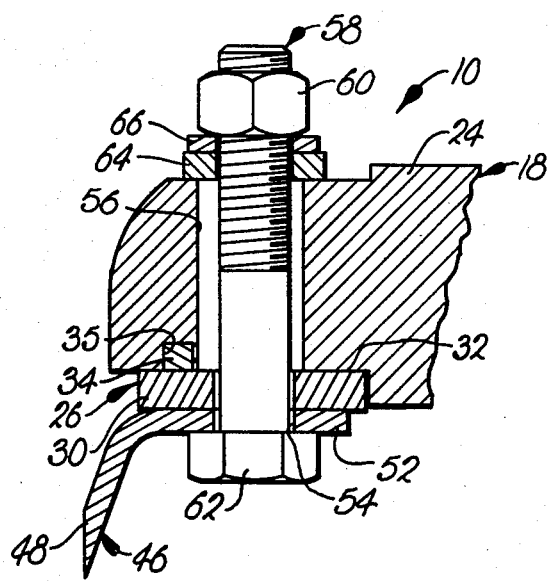

TWO-WAY KNIFE ADJUSTMENT FOR CROP HARVESTER CUTTING CYLINDER

TECHNICAL FIELD

This invention relates to harvesting equipment, and more particularly to unique means for adjusting the position of the circumferentially spaced apart knives of a forage harvester rotary chopping cylinder along paths of travel radially inwardly and outwardly relative to the cutting cylinder.

BACKGROUND

Forage choppers typically employ chopping cylinders that include a plurality of circumferentially spaced apart knives mounted on a radially extending support arms. The knives are rotated by the cylinder at high speeds and cooperate with a stationary shear bar to chop incoming crop stalks and the like into small segments. The orientation of the knives relative to the shear bar is critical to achieve proper severence and uniform length of the chopped segments. Thus, it is essential that the position of the knives on the cylinder support arms be adjustable such that proper orientation of the knives relative to the shear bar can be made upon initial installation of the knives, and as may be necessary or desirable to accommodate for wear on the part of the knives and the shear bar.

A mechanism for adjusting the position of a harvester knife along a path of travel relative to a cylinder supporting arm is disclosed in U.S. Pat. No. 3,797,766. The adjustment mechanism of U.S. Pat. No. 3,797,766, however, does not provide for a positive, two-way adjustment of the knife. An adjuster capable of positive two-way adjustment of the knife would greatly enhance and speed-up the operation of properly orienting the knife relative to the shear bar.

SUMMARY OF THE INVENTION

The problems referred to above are in large measure solved by the two-way knife adjustment mechanism in accordance with the present invention. That is to say, the adjusting mechanism hereof enables positive adjustment of a forage harvester's knives radially inwardly and outwardly along a path of travel relative to the knife-supporting arms of the chopping cylinder.

In this regard, the present invention contemplates the use of a special slide plate that can be shifted in either direction along a path of travel that is transverse to the direction of in-and-out radial adjustment of the knife. An oblique slot in the plate causes a bolt which passes through the knife to be pushed radially inwardly or outwardly when the plate is shifted in a selected transverse direction so that the knife is in turn forced inwardly or outwardly by the bolt. A transverse interfitting key and key way structure between the slide plate and a proximal support arm guides the plate in its movement and absorbs radial loading place on the knife during cutting operations.

BRIEF DESCRIPTION OF THE DRAWINGS

FIG. 1 is a schematic diagram of a forage harvester depicting the feed rolls, shear bar, and chopping cylinder thereof;

FIG. 2 is an enlarged front elevational view of a two-way knife adjuster in accordance with the present invention, with an attached cutting blade fragmentarily depicted;

FIG. 3 is a sectional view taken along line 3—3 of FIG. 2;

DETAILED DESCRIPTION

Figure 7:
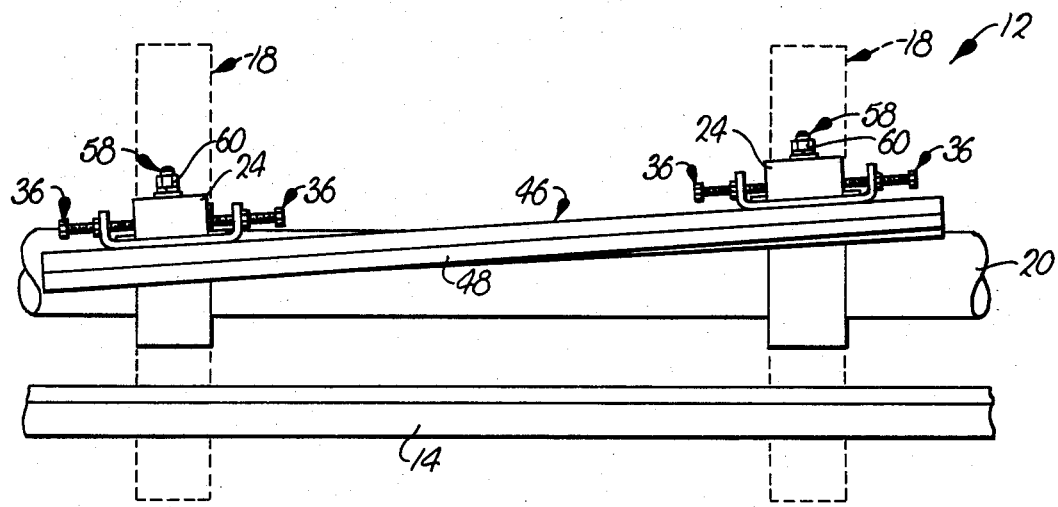
FIG. 7 is a fragmentary front view of a shear bar and chopped cylinder having a knife and a two-way adjustment mechanism in accordance with the present invention mounted thereon, dashed lines indicating the outline presented by the chopping cylinder's knive-supporting arms.
Figure 8:
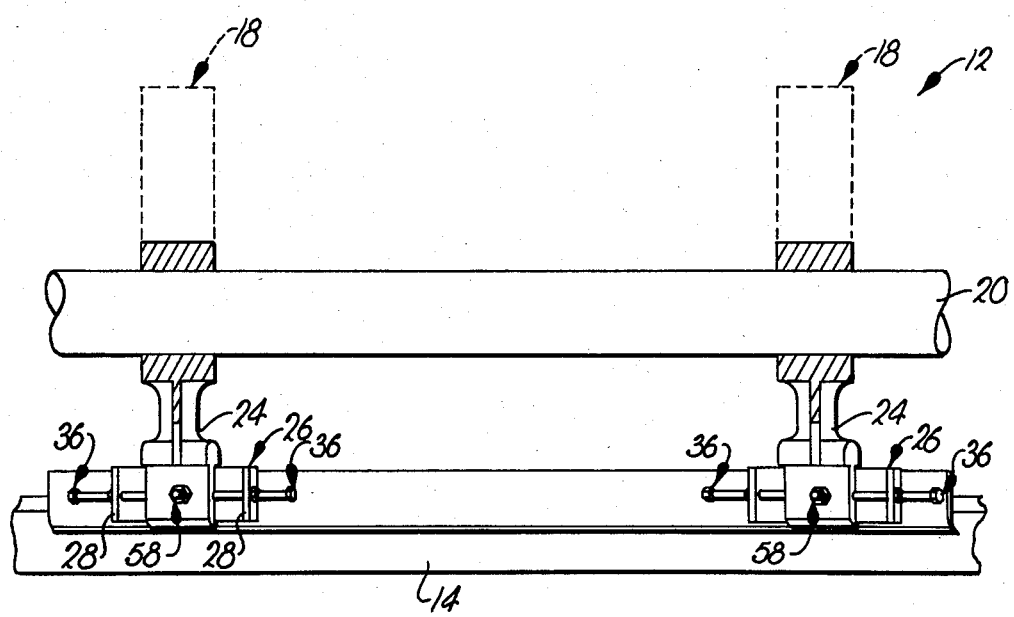
FIG. 8 is a fragmentary, sectional, top view of a shear bar and chopping cylinder having a knife and a two-way adjustment mechanism in accordance with the present invention mounted thereon, dashed lines indicating the outline presented by the chopping cylinder's knife-supporting arms.

Referring to the drawings, a two-way knife adjustment mechanism 10 in accordance with the present invention is a component part of the rotatable chopping cylinder 12, depicted in FIG. 1 in conjunction with a shear bar 14 and the feed roll assembly 16 of a forage harvester. The chopping cylinder 12 includes at least a pair of spaced apart knife-supporting structures 18 (FIGS. 7 and 8), fixed mounted on a drive shaft 20 by means of a key 22 (FIG. 1). The structure 18 each include plurality of circumferentially spaced apart knife-supporting arms 24.

The adjusters 10 each include a generally C-shaped slide plate 26 on the front face of the arm 24 having a pair of spaced apart, inturned, parallel ears 28 which are interconnected by an elongated bight 30 and which overlie opposite sides of the arm 24. The inwardly facing surface 32 of bight 30 includes a longitudinally extending, elongated key 34 which is slidably received in a complementary key way 35 in the front face of the arm 24. An elongated slot 37 in the bight 30 has a major axis oriented obliquely to the key 34 and thus also to the path of sliding travel of the plate 26.

An adjusting screw 36 is threadably received through an aperture in each ear 28. Each screw 36 includes a threaded shank 38, a head 40, and locking nut 42. The tip of each shank 38 impinges against the proximal side of the knife-supporting arm 24.

Each arm 24 supports one end of an elongated chopping knife 46 having a cutting portion 48 and a supporting portion 52. The supporting portion 52 of each knife 46 includes a generally circular aperture 54 therethrough at each of its two ends.

Figure 4:
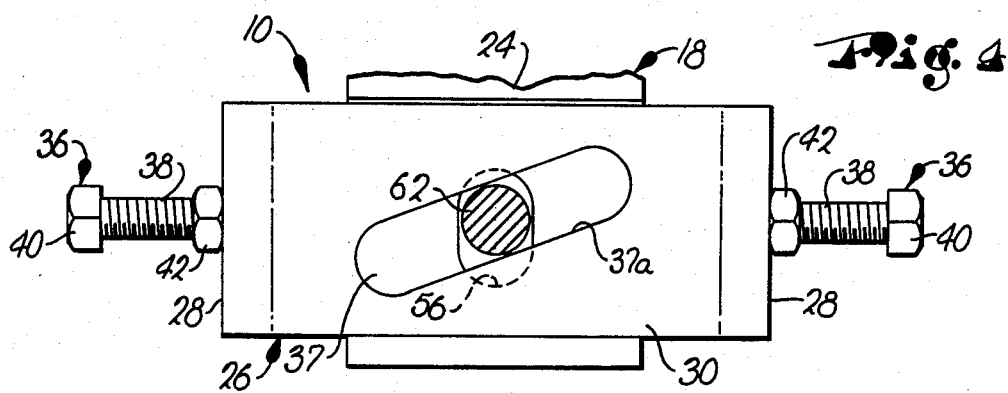
FIG. 4 is a sectional view of the two-way adjuster taken along line 4—4 of FIG. 2.
Figure 5:
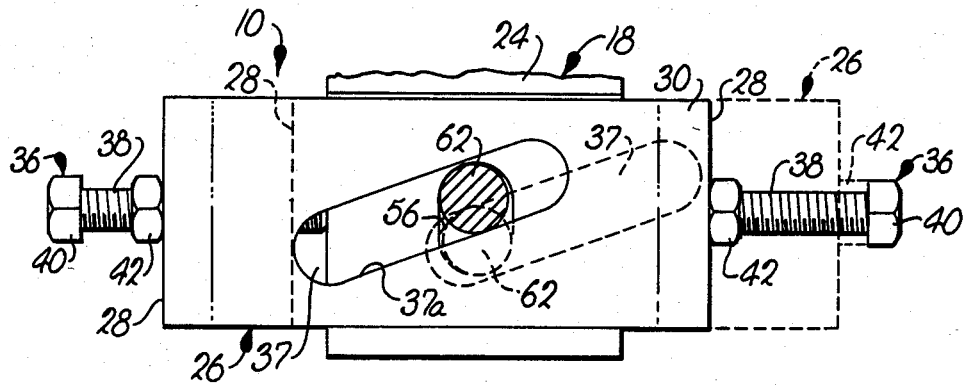
FIG. 5 is similar to FIG. 4, but with the slide plate of the adjuster shifter to a second position, dotted lines indicating a third position of the plate.
Figure 6:
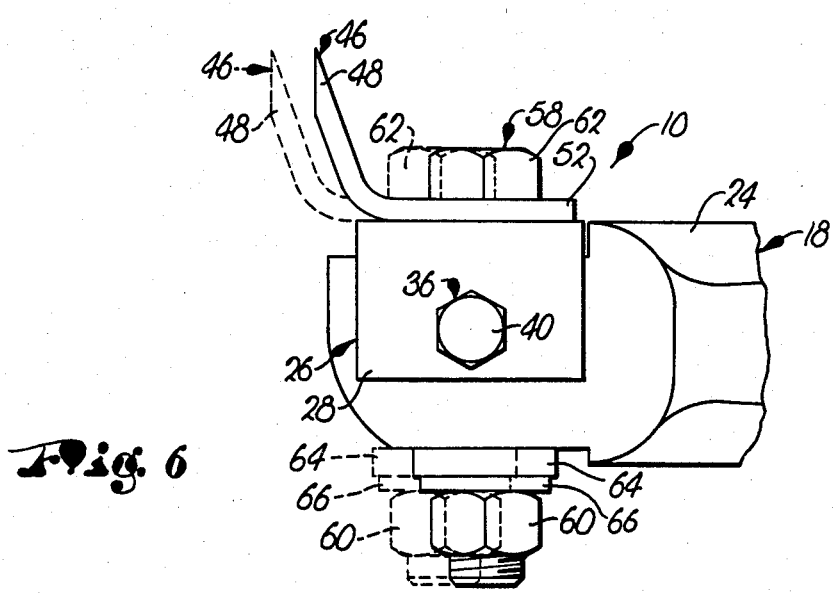
FIG. 6 is a fragmentary view of a knife supporting cylinder arm having a two-way adjuster in accordance with the present invention mounted thereon, dashed lines indicating a second position of the knife.

Each support arm 24 includes a bored through channel 56 at its outermost end, oriented perpendicular to the axis of the chopping cylinder 12. As best depicted in FIG. 4 and FIG. 5, the channel 56 has a generally elliptical cross-section having a major axis corresponding to the desired path of adjusting travel of the knives 46. A knife holding assembly 58 comprising a nut 60 and bolt 62 is received through the relatively close-fitting blade aperture 54, slot 37, and bored through channel 56. A solid washer 64 and split washer 66 are interposed between the nut 60 and the backside of the arm 24.

In operation, the nut 60 is tightened down on bolt 62 such that each blade 46, plate 26 and support arm 24 are maintained in fixed relationship. Adjusting screws 38 are shifted such that the tips of the screws 38 impinge on the arm 24. Locking nuts 42 are tightened against their respective ears 28. The combined holding effect of the nut and bolt 60, 62, adjusting screws 38, key 34, and key way 35 prevents shifting of the blade 46 relative to the knife-supporting arms 24.

Upon initial installation of the blades 46, or at any time adjustment of the blades relative to the shear bar 14 is required, the nut and bolt 60, 62 are loosened, as are locking nuts 42 on adjusting screws 36. Shifting of the blades 46 in a path of travel radially inwardly or outwardly relative to the chopping cylinder 12 may be accomplished by rotating one of the adjusting screws 36 in a direction to extract it from its associated ear 28 and rotating the opposed adjusting screw 38 in a direction so as to extend the shank 38 of the adjusting bolt 36 further through its associated ear 28, so as to exert a moving force at the tip of the screw 38 on the arm 24. Impingement of one adjusting screw 38 on the arm 24 in the described manner shifts the adjusting plate 26 transversely of the desired path of travel of the blade 46. In this regard, the adjusting plate 26 is guided in its shifting movement by key 34 and associated key way 35.

When the adjusting plate 26 is shifted in the manner described, the sides of the oblique slot 37 in the bight 30 of the adjusting plate 26 impinge on the bolt 62, and the bolt 62 is shifted along the major axis defined by the cross-section of channel 56. The apertures 54 in supporting portions 52 of knives 46 are of only slightly greater diameter than the shanks of bolts 62, such that shifting of a bolt 62 in the manner described causes corresponding shifting of the blade 46 along the desired path of travel. From the perspective of FIGS. 4 and 5, the adjuster 10 may be reciprocated from right to left, or left to right, shifting the bolt 60 upwardly and downwardly.

It is to be appreciated that adjustment of the knife 46 can be carried out very accurately as a result of the present invention. Turning the adjusting screws 36 in their threaded apertures results in only a small increment of transverse movement by the slide plate 26, depending upon the pitch of the threads on screws 38. Moreover, in the event that having adjusted the knife 46 in one direction it then becomes apparent that readjustment in the opposite direction is necessary, the "fine tuning" made available by the two counteracting screws 38 is very beneficial at that juncture.

Furthermore, the positive adjustment in either direction which is available as a result of the present invention contributes to accuracy of adjustment and thus ultimately to uniformity of chop length and longer knife life. In this respect, rather than relying upon the effects of gravity or manual pressure to force the knife 46 back in toward the center of the cylinder 12 in the event that should be necessary because of over-adjusting or otherwise, the radially outer edge 37a of the slot 37 is always in very close proximity to the bolt 62 as illustrated in FIGS. 4 and 5 such that there is very little lost motion of the adjusting screws 36 when return adjustment is required. After only the slightest amount of return transverse movement of the slide plate 26 by the screws 36, the outer edge 37a of the slot 37 comes back into engagement with the bolt 62 to force the latter radially inwardly, hence likewise shifting in the cutting edge of the knife 46. Such responsiveness and precision have not heretofore been available.

Once the adjusted position has been decided upon, the screws 36 are tightened down, as are their lock nuts 42. Thereupon the nut 60 of the bolt 62 is also retightened. With these components secure, they cooperate with the key 34 and key way 35 to tightly retain the knife 46 in its selected position and to absorb loading placed on the same during cutting operations.

We claim:

1. In a rotary cutting cylinder for a crop harvester having a plurality of circumferentially spaced apart knives, and structure supporting the knives for inward and outward adjustment movement along respective paths of travel, the improvement comprising;
   means associated with each of said knives for releasably holding same on said structure in a selected position along said path of travel of the knife; and
   an adjuster for each knife reciprocable transversely of said path of travel thereof,
   said adjuster having a portion thereof disposed to effect both said inward and said outward movement of each knife in response to reciprocation of the adjuster when said holding means is released,
   said portion of the adjuster including a pair of opposed surfaces, each of which is disposed in oblique relationship to said path of travel of each knife, one of said surfaces being coupled in force-transmitting relationship with each knife when the adjuster is shifted transversely of said path of travel in one direction and the other of said surfaces being coupled in force-transmitting relationship with each knife when the adjuster is shifted transversely of said path of travel in an opposite direction.

2. The improvement as claimed in claim 1, said opposed surfaces being mutually parallel.

3. The improvement as claimed in claim 1, said holding means including a support and a bolt clamping the knife against said support, said bolt being movable with said knife and being confined by said support against reciprocation with said adjuster.

4. The improvement as claimed in claim 3, said adjuster having a slot therein receiving said bolt and disposed in oblique relation to said path of travel of the knife, said opposed surfaces comprising opposite surface extremities of said slot.

5. The improvement as claimed in claim 4, said adjuster being provided with an actuating assembly operably interconnecting the support and the adjuster for effecting said reciprocation of the adjuster upon operation of said assembly.

6. The improvement as claimed in claim 5, said adjuster including a pair of opposed ears situated on opposite sides of said support, said assembly including a pair of opposed adjusting screws for opposite ones of said ears, each screw being threadably received by its corresponding ear and bearing against a corresponding side of said support.

7. The improvement as claimed in claim 5, said adjuster and said supporting structure having a transverse key and a mating key way therebetween for guiding the adjuster in its reciprocal movement.

8. The improvement as claimed in claim 7, said key being on the adjuster and said key way being on said structure.

* * * * *